(12) United States Patent
Wu et al.

(10) Patent No.: US 11,531,619 B2
(45) Date of Patent: Dec. 20, 2022

(54) HIGH BANDWIDTH MEMORY SYSTEM WITH CROSSBAR SWITCH FOR DYNAMICALLY PROGRAMMABLE DISTRIBUTION SCHEME

(71) Applicant: Meta Platforms, Inc., Menlo Park, CA (US)

(72) Inventors: Olivia Wu, Los Altos, CA (US); Abdulkadir Utku Diril, Menlo Park, CA (US); Krishnakumar Narayanan Nair, Newark, CA (US); Aravind Kalaiah, San Jose, CA (US); Anup Ramesh Kadkol, Sunnyvale, CA (US); Pankaj Kansal, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 93 days.

(21) Appl. No.: 16/717,998

(22) Filed: Dec. 17, 2019

(65) Prior Publication Data
US 2021/0182196 A1    Jun. 17, 2021

(51) Int. Cl.
*G06F 12/08* (2016.01)
*G06F 12/0813* (2016.01)
(Continued)

(52) U.S. Cl.
CPC ...... *G06F 12/0813* (2013.01); *G06F 13/1657* (2013.01); *G06N 3/02* (2013.01); *G06F 2212/2542* (2013.01)

(58) Field of Classification Search
CPC ........... G06F 15/17393; G06F 12/0813; G06F 13/1657; G06F 2212/2542; G06N 3/02
See application file for complete search history.

(56) References Cited

U.S. PATENT DOCUMENTS 5,410,300 A * 4/1995 Gould .................... H04L 12/00
                                                340/2.2
5,778,419 A * 7/1998 Hansen ............... G06F 9/30025
                                                712/E9.055
(Continued)

FOREIGN PATENT DOCUMENTS

WO        0036513        6/2000

OTHER PUBLICATIONS

Algorithmic Techniques for Regular Networks of Processors by Miller (Year: 2009).*
(Continued)

*Primary Examiner* — Paul M Knight
(74) *Attorney, Agent, or Firm* — Van Pelt, Yi & James LLP (57) ABSTRACT

A system comprises a processor coupled to a plurality of memory units. Each of the plurality of memory units includes a request processing unit and a plurality of memory banks. Each request processing unit includes a plurality of decomposition units and a crossbar switch, the crossbar switch communicatively connecting each of the plurality of decomposition units to each of the plurality of memory banks. The processor includes a plurality of processing elements and a communication network communicatively connecting the plurality of processing elements to the plurality of memory units. At least a first processing element of the plurality of processing elements includes a control logic unit and a matrix compute engine. The control logic unit is configured to access the plurality of memory units using a dynamically programmable distribution scheme.

20 Claims, 7 Drawing Sheets

(51) Int. Cl.
*G06F 13/16* (2006.01)
*G06N 3/02* (2006.01)

(56) References Cited

U.S. PATENT DOCUMENTS

| | | | | |
|---|---|---|---|---|
| 6,088,704 | A * | 7/2000 | Aiba | G06F 16/10 |
| 6,457,085 | B1 * | 9/2002 | Reddy | G06F 13/161 |
| | | | | 713/502 |
| 6,728,258 | B1 * | 4/2004 | Okada | G06F 12/0833 |
| | | | | 711/146 |
| 6,789,173 | B1 * | 9/2004 | Tanaka | G06F 12/0813 |
| | | | | 370/352 |
| 10,180,919 | B1 * | 1/2019 | Johnson | G06F 13/4247 |
| 2006/0176885 | A1 * | 8/2006 | Goodman | G06F 12/0831 |
| | | | | 370/401 |
| 2007/0245046 | A1 * | 10/2007 | Asaro | G06F 13/404 |
| | | | | 710/62 |
| 2007/0294426 | A1 * | 12/2007 | Huang | H04L 47/746 |
| | | | | 709/234 |
| 2010/0217939 | A1 * | 8/2010 | Sugizaki | G06F 12/0811 |
| | | | | 711/E12.001 |
| 2016/0284425 | A1 * | 9/2016 | Kulkarni | G11C 15/00 |
| 2017/0228317 | A1 * | 8/2017 | Drapala | G06F 12/0817 |
| 2018/0143905 | A1 * | 5/2018 | Roberts | G06F 12/0822 |
| 2019/0026251 | A1 * | 1/2019 | Bekas | G11C 13/003 |
| 2019/0050719 | A1 * | 2/2019 | Cantin | G06N 3/04 |
| 2019/0394081 | A1 * | 12/2019 | Tahhan | H04L 41/0654 |

OTHER PUBLICATIONS

Domain Decomposition in Distributed and Shared Memory Environments by Fox (Year: 1987).*
NUMA-Aware Shared-Memory Collective Communication for MPI by Li (Year: 2013).*
The Cross Bar Switch by Emory (Year: 2018).*
Accounting for Memory Bank Contention and Delay in High � � Bandwidth Multiprocessors by Belloch (Year: 1995).*
CPU versus GPU: which can perform matrix computation faster performance comparison for basic linear algebra subprograms by Li (Year: 2018).*
Improving System Energy Efficiency with Memory Rank Subsetting by Ahn (Year: 2012).*
GraphH: A Processing-in-Memory Architecture for Large-Scale Graph Processing by Dai (Year: 2019).*
Newton: Gravitating Towards the Physical Limits of Crossbar Acceleration by Nag (Year: 2018).*
Extended European Search Report for European Application No. 20211498.9, dated May 18, 2021, 09 Pages.

* cited by examiner

HIGH BANDWIDTH MEMORY SYSTEM WITH CROSSBAR SWITCH FOR DYNAMICALLY PROGRAMMABLE DISTRIBUTION SCHEME

BACKGROUND OF THE INVENTION

A whole class of complex artificial intelligence problems can be solved using neural networks. Since these problems are often computationally and data intensive, hardware solutions are often beneficial for improving the performance of neural networks. Since the solutions typically require processing large amounts of data, the performance of memory-based operations is critical. It is a technical challenge to create a hardware platform for solving neural networks while achieving memory access performance and efficiency requirements. Therefore, there exists a need for a hardware platform with a memory access and layout scheme that is able to effectively perform memory operations needed for neural network processing.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A high bandwidth memory system is disclosed. The memory units of a processor system are arranged surrounding a processing component and each memory unit is able to receive and process multiple requests in parallel from the processing component. In some embodiments, the processing component is arranged in a central location relative to the multiple memory units, which may include separate north, east, south, and west memory units, each memory unit communicatively connected to the processing component via multiple network connections. The processing component can be a processor with multiple processing elements, where each processing element includes its own control logic and matrix compute engine. Processing elements of the processor can work together in parallel by applying a neural network to solve complex artificial intelligence problems. The processing elements are part of the disclosed high bandwidth memory system for efficiently transferring data between memory and the processing component. Memory requests originate from the processing component, for example, from one or more processing elements, to the memory units. In some embodiments, each memory unit includes a plurality of memory banks, such as 4, 8, 16, 32, or another appropriate number of memory banks, for storing data. Memory requests are served from data stored in the memory banks of a memory unit.

In some embodiments, each memory request is broadcasted to all memory units and each memory unit responds only to the portion of the request it is responsible for. For example, data covering a continuous address range may be distributed across the memory units in access unit size groups and each memory unit responds only to the portion stored in its memory banks. The memory requests may reach each memory unit via one of a plurality of network connections to the processing component. For example, the processing component may include a two-dimensional array of processing elements connected via a two-dimensional network subsystem. In some embodiments, each row and column of the network subsystem is communicatively connected to at least one memory unit via a network connection. For example, an 8×8 grid or array of processing elements includes eight network connections to each of four memory units on the north, east, south, and west side of the processing component. By having multiple network connections, each memory unit can processes multiple memory requests from different processing elements in parallel. For example, a memory unit can service one request from one memory bank and another from another memory bank in parallel. In some embodiments, the memory unit includes a request processing unit for receiving memory requests. Each request processing unit includes a set of decomposition units to decompose the memory request into partial requests. The request processing unit determines which partial requests can be served from the memory unit and only continues processing the ones that match the memory unit. In some embodiments, a crossbar switch is connected to the decomposition units to route matching partial memory requests to the appropriate memory bank(s). A memory request received at any network connection of the memory unit can be routed to the proper memory bank via the crossbar switch. The crossbar switch allows each network connection to access any memory bank of the memory units. In some embodiments, the crossbar switch allows requests received at multiple network connections of a memory unit to access different memory banks in parallel, significantly increasing the maximum memory bandwidth and improving memory performance.

In some embodiments, each processing element of the processing component can be configured with a distribution scheme to scatter data across the available memory units. The distribution scheme is dynamically programmable such that different processing elements can apply the same or different distribution schemes. For example, in various embodiments, each processing element can be programmed using a processor instruction to dynamically configure the distribution scheme for that processing element. In various embodiments, processing elements sharing the same workload can be programmatically configured to utilize the same distribution scheme and processing elements with different workloads can be programmatically configured to utilize different distribution schemes. Different distribution schemes help to prevent multiple processing elements from working in lockstep with one another. By varying the distribution schemes, the memory units are more efficiently utilized and memory performance is increased. In some embodiments, the size of the memory unit access units is also configurable. For example, the size of the memory unit access units can be programmatically configured via a processor instruction. Each processing element can read and/or write data to each memory unit using a configurable access unit-sized group. Moreover, memory access operations can span multiple access units and reference data distributed across multiple memory units. In various embodiments, each memory access request is broadcasted to all memory units and each memory unit returns partial responses that are combined to fulfill the broadcasted request.

In some embodiments, a processor system comprises a processor coupled to a plurality of memory units. For example, a processor or processing component is surrounded by memory units on four sides and has multiple network connections to each memory unit. Each of the plurality of memory units includes a request processing unit and a plurality of memory banks. For example, each memory unit may include 4, 8, 16, or another appropriate number of memory banks for storing data. Each request processing unit includes a plurality of decomposition units and a crossbar switch, the crossbar switch communicatively connecting each of the plurality of decomposition units to each of the plurality of memory banks. For example, a decomposition unit used to decompose or unroll memory access requests is communicatively connected to each of the memory banks of the memory unit via a crossbar switch. In some embodiments, the processor includes a plurality of processing elements and a communication network communicatively connecting the plurality of processing elements to the plurality of memory units. For example, an array of processing elements is connected to the memory units via a network-on-chip communication subsystem. At least a first processing element of the plurality of processing elements includes a control logic unit and a matrix compute engine, and the control logic unit is configured to access the plurality of memory units using a dynamically programmable distribution scheme. For example, a processing element used for performing matrix compute operations can access data that is distributed across the memory units using a distribution scheme that can be configured dynamically. In some embodiments, the distribution scheme is configured by the control logic unit of each processing element via a processor instruction and/or programmatically.

In some embodiments, a processor system comprises a plurality of memory units and a processor coupled to the plurality of memory units. For example, a processor system includes a processor communicatively connected to multiple memory units. In some embodiments, the memory units are arranged on all sides of the processor to help minimize latency from the processor to each memory unit. Each of the plurality of memory units includes a request processing unit and a plurality of memory banks. For example, a request processing unit receives memory access requests, such as read and/or write requests, and determines whether and how to process the request. The request processing unit can determine whether a portion of the memory access request can be served by the memory unit and its corresponding memory banks. For example, the request processing unit can decompose a memory access request into partial requests and determine what subset of the partial requests may be served from the corresponding memory banks of the memory unit. In various embodiments, each memory unit can include multiple memory banks to increase the memory size of a memory unit. For example, a memory unit can include 4, 8, 16, 32, or another appropriate number of memory banks. In some embodiments, the processor includes a plurality of processing elements. For example, the processor is a processing component that includes a group of processing elements. The processing elements may be arranged in a matrix, such as an 8×8 grid or array of processing elements. The processor also includes a communication network communicatively connecting the plurality of processing elements to the plurality of memory units. For example, a communication network such as a network-on-chip subsystem and/or network interfaces/buses communicatively connect each processing element to each memory unit. In some embodiments, each processing element of the plurality of processing elements includes a control logic unit and a matrix compute engine. For example, a first processing element of the plurality of processing elements includes a control logic for controlling the first processing element and a matrix compute engine for computing matrix operations. The control logic is configured to access data from the plurality of memory units using a dynamically programmable distribution scheme. For example, the control logic is configured using a processor instruction to utilize a specific distribution scheme or pattern. The scheme may be based on the processing element workload or another appropriate configuration. The distribution scheme determines the mapping of memory addresses specific to the processing element to memory locations of the memory units.

Figure 1:
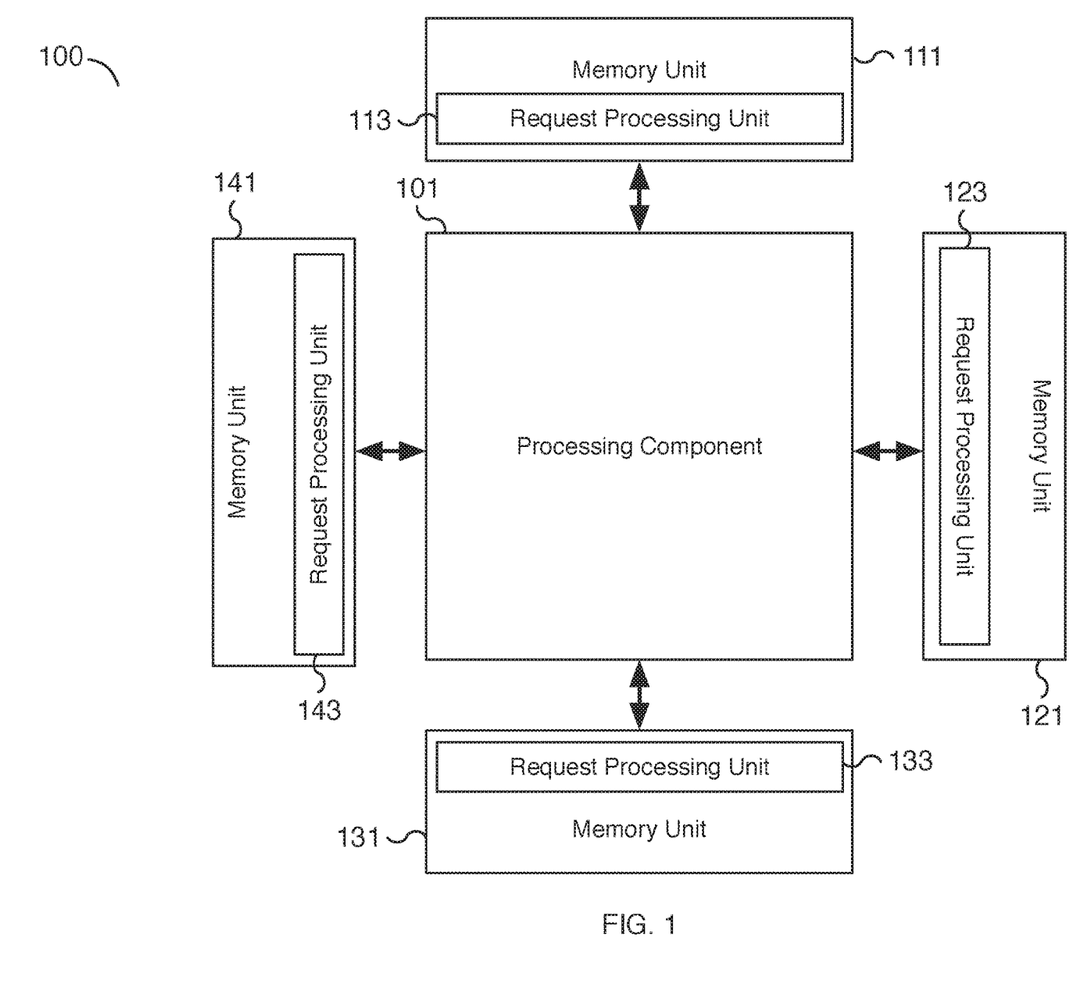
FIG. 1 is a block diagram illustrating an embodiment of a system for solving artificial intelligence problems using a neural network.

FIG. 1 is a block diagram illustrating an embodiment of a system for solving artificial intelligence problems using a neural network. In the example shown, the system 100 is a hardware platform that includes processing component 101 and memory units 111, 121, 131, and 141. Memory units 111, 121, 131, and 141 each include one of request processing units 113, 123, 133, and 143, respectively. Processing component 101 is communicatively connected to memory units 111, 121, 131, and 141. Processing component 101 is connected to and can communicate with each of memory unit 111, 121, 131, and 141 simultaneously. In some embodiments, each memory unit 111, 121, 131, and 141 is connected to processing component 101 via multiple network connections (depicted as the thick arrows between memory units 111, 121, 131, and 141 and processing component 101). The memory units 111, 121, 131, and 141 are positioned around processing component 101 but other layouts are appropriate. By positioning memory units 111, 121, 131, and 141 around processing component 101, memory units 111, 121, 131, and 141 can be accessed simultaneously by processing component 101 and/or multiple connections may be used by processing component 101 to communicate with different memory units 111, 121, 131, and 141 in parallel. In the example shown, system 100 includes four memory units that surround a processing component but fewer or more memory units may be utilized as appropriate.

In some embodiments, processing component 101 is a processor that includes one or more processing elements (not shown). Each processing element may include at least a matrix compute engine for performing matrix operations. The processing elements may be further communicatively connected using a communication network and/or bus such as a network-on-chip subsystem. In some embodiments, the processing elements are arranged in a two-dimensional array and the network subsystem is a two-dimensional communication network that connects the processing elements. Data for performing neural network operations may be retrieved from and written to memory units such as memory units 111, 121, 131, and 141 located around processing component 101. For example, using a network-on-chip subsystem, memory access operations can be directed to memory, including memory units 111, 121, 131, and 141, from a processing element of processing component 101. In some embodiments, each processing element can be assigned a particular workload and each workload may be associated with a particular set of data stored in memory. For example, the set of data for a workload may include activation and/or filter matrix data. In various embodiments, the data is associated with large neural network matrices and may include hundreds or more matrix elements. The relevant data may be stored across different regions of memory units 111, 121, 131, and 141. In some embodiments, the data is stored in access unit-sized groups distributed across memory units 111, 121, 131, and 141 based on a dynamically programmable distribution scheme.

In some embodiments, the data may be accessed by workload or another appropriate identifier. For example, a workload identifier may be used to determine how to distribute and retrieve data across the different available memory units. In various embodiments, different workloads are programmed to distribute their corresponding workload data across available memory units using different distribution schemes. For example, each workload can be dynamically programmed to use a different distribution scheme. In various embodiments, a distribution scheme uses a configurable ordered pattern for accessing memory units. Instead of using a predefined distribution for all workloads, a processing element can be dynamically programmed to distribute data differently from other processing elements. This allows for better utilization and efficiency of the memory units. In various embodiments, the data associated with a memory access operation may reside in one or more different memory units. For example, a memory read request may be served by data located in memory units 111, 121, and 131. A different memory request may be served by data in memory units 121, 131, and 141. In some embodiments, a hash function, such as a programmable hash function, is used to determine the memory layout scheme or access order pattern for a particular workload or identifier. For example, a memory read request for one processing element may access memory units using a repeating ordered pattern starting with memory unit 111 followed by memory unit 121, memory unit 131, and memory unit 141. A memory read request for a different processing element may use a different programmable repeating ordered pattern starting with memory unit 141 followed by memory unit 121, memory unit 131, and memory unit 111. Since data is distributed across different memory units, a memory request can trigger one or more partial responses from different memory units that each respond to a portion of the memory request. Once all partial responses have been received by a processing element, the memory request is complete.

In some embodiments, memory units 111, 121, 131, and 141 each include one of request processing units 113, 123, 133, and 143, respectively, to process memory access operations. A memory access operation, such as a write or read memory access operation, can be split into multiple partial access requests. In some embodiments, the memory access operation is decomposed or unrolled into one or more partial access requests by one or more request processing units such as request processing units 113, 123, 133, and/or 143. For example, a decomposition unit (not shown) connected to each network connection of a memory unit can decompose each incoming memory access request. Based on the memory range requested, a request processing unit determines whether its associated memory unit contains the requested data. For example, in some embodiments, a memory request is broadcasted to all memory units and is processed by the corresponding request processing unit of each memory unit. Each request processing unit analyzes the request and different request processing units respond to different portions of the memory request. For example, a request processing unit responds only to requests for data or memory addresses associated with its memory unit. Request processing unit 113 responds to requests associated with memory unit 111, request processing unit 123 responds to requests associated with memory unit 121, request processing unit 133 responds to requests associated with memory unit 131, and request processing unit 143 responds to requests associated with memory unit 141. In the event a memory access request can be served by a particular memory unit, the associated request processing unit can retrieve the relevant data from (or write the relevant data to) the associated memory unit. Memory access requests that cannot be served by the particular memory unit can be ignored and will be handled by the corresponding appropriate memory unit. In some embodiments, each memory unit contains multiple memory banks and the request processing unit can direct the partial memory access request to the appropriate memory bank of the memory unit via a crossbar switch (not shown). The crossbar switch may provide full connectivity between different network connections and the different memory banks of a memory unit.

In some embodiments, the size of a data access unit used by each memory unit is programmable. For example, memory units can be programmed to use a 128 byte or another appropriately sized access unit such that every new group of 128 bytes (or another appropriate access unit size) is stored on a different memory unit based on the programmable distribution scheme. This allows the data to be written across different memory units using programmable sized access units. For example, the first access unit of data is written to a first memory unit, the second access unit of data is written to a second memory unit, and so forth, as determined by the ordering of the distribution scheme. Once all memory units have been utilized, the next memory unit cycles back to the first memory unit. In various embodiments, the order of the memory units can also be programmable and may be determined using a hashing function. For example, each workload may utilize a different distribution order for accessing memory units based on the outcome of the hashing function.

Figure 2:
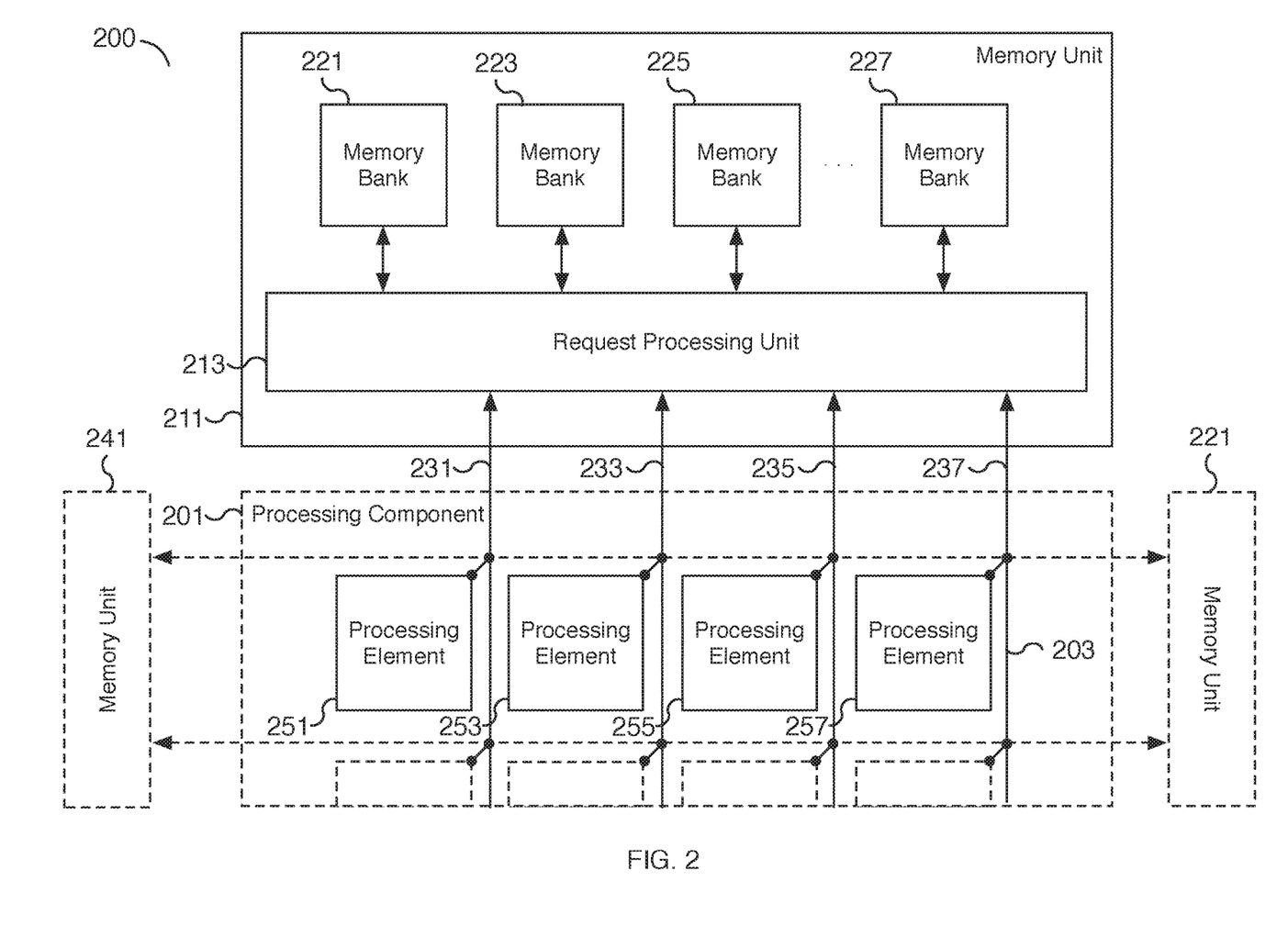
FIG. 2 is a block diagram illustrating an embodiment of a system for solving artificial intelligence problems using a neural network.

FIG. 2 is a block diagram illustrating an embodiment of a system for solving artificial intelligence problems using a neural network. In the example shown, the system 200 is a partial depiction of a hardware platform that includes processing component 201 and memory unit 211, 221, and 241. Additional memory units may be included but are not displayed. For example, in some embodiments, a fourth memory unit is not depicted in FIG. 2 but is located on the south side of processing component 201. Each memory unit includes a request processing unit and multiple memory banks. For example, memory unit 211 includes request processing unit 213 and memory banks such as memory banks 221, 223, 225, and 227. Each memory unit, such as memory unit 211, may be configured with additional (or fewer) memory banks than shown. Memory units 221 and 241 are depicted with dotted lines. Their internal components are not shown but resemble memory unit 211. Similarly, additional components may be included in the hardware system but are not displayed. In some embodiments, processing component 201 is processing component 101 of FIG. 1 and memory unit 211 is memory unit 111, 121, 131, or 141 of FIG. 1. In some embodiments, memory unit 221 is memory unit 121 of FIG. 1 and memory unit 241 is memory unit 141 of FIG. 1. In various embodiments, the functionality described with respect to processing component 201 and memory unit 211 applies to other memory units connected to processing component 201 including memory units 221, 241, and/or memory units that are not shown in FIG. 2.

In some embodiments, processing component 201 is a processor that includes multiple processing elements such as processing elements 251, 253, 255, and 257. Additional processing elements are illustrated with dotted lines to reflect the inclusion of additional processing elements that function in a similar manner as processing elements 251, 253, 255, and 257. In the diagram of FIG. 2, only a portion of processing component 201 is shown. Processing component 201 includes network-on-chip subsystem 203 with network connections 231, 233, 235, and 237 communicatively connecting processing elements of processing component 201 to memory unit 211. Network-on-chip subsystem 203 is a communication network and/or communication bus that communicatively connects the processing elements, including processing elements 251, 253, 255, and 257, to one another. Network-on-chip subsystem 203 can be used for processing elements to communicate with one another and/or to communicate with memory units such as memory unit 211 via network connections 231, 233, 235, and 237. Network connections 231, 233, 235, and 237 connect processing component 201 to memory unit 211 on the north side of processing component 201. For example, processing element 251 of processing component 201 can interface with memory unit 211 via network-on-chip subsystem 203 and network connections 231 to read and/or write data from memory. In various embodiments, network connections (not labeled) on the east side of processing component 201 connect processing component 201 to memory unit 221 and network connections (not labeled) on the west side of processing component 201 connect processing component 201 to memory unit 241. Additional network connections (not shown) may be included to connect processing component 201 to a memory unit placed on the south side of processing component 201. The example of FIG. 2 focuses on the interface between processing component 201 and a single memory unit, memory unit 211, but the techniques disclosed are applicable to other memory units as well.

In some embodiments, memory unit 211 includes request processing unit 213 and multiple memory banks such as memory banks 221, 223, 225, and 227. Request processing unit 213 receives memory access requests from processing elements of processing component 201. The memory access requests may be read and/or write requests. Request processing unit 213 decomposes the memory access request to determine whether it can be served, potentially partially, by one of the memory banks of memory unit 211. Although four memory banks are shown in FIG. 2, in various embodiments, memory unit 211 can include fewer or many more memory banks such as 8, 16, 32, 64, or another appropriate number of memory banks. In some embodiments, request processing unit 213 directs memory access requests to the appropriate memory bank(s) of memory unit 211. For example, based on the memory address of the request, request processing unit 213 determines the appropriate memory bank(s) to access. In some embodiments, two or more memory banks of memory unit 211 may be accessed for a single memory access request. The memory units and banks may be determined based on a hashing function. For example, the hashing function may utilize a workload identifier of a processing element to distribute data across memory units and banks based on a processing element's workload. In some embodiments, the hashing function inspects a set of bits, such as two or more bits, of a memory address associated with the memory access request. In various embodiments, request processing unit 213 includes a crossbar switch (not shown) to connect network connections 231, 233, 235, and 237 to memory banks 221, 223, 225, and 227.

In some embodiments, the memory read/write size, such as the size of a memory access unit, can be programmable. For example, memory reads can be programmed to be 64 bytes, 128 bytes, or another appropriate access unit size. Request processing unit 213 can determine the appropriate bytes to read and/or write by analyzing each incoming memory access request. In the event a request can be served by the memory unit, such as memory unit 211, a memory request response will be returned to processing component 201 and the appropriate requesting processing element(s). In some embodiments, request processing unit 213 prepares a response. For example, a response prepared may include data read from a memory bank. The response may be a partial response that fulfills only a portion of the original memory access request. Other memory units, such as memory units 221 and 241, and/or another memory unit or memory units not shown, responsible for managing the corresponding memory address ranges may fulfill additional partial responses. For example, a large memory read request broadcasted to all memory units may be fulfilled by multiple partial responses supplied by multiple memory units. In some embodiments, each partial response includes an identifier such as a sequence identifier that may be used to order the partial responses. For example, partial responses may not be received in order and an identifier is used to order the partial responses and build a complete response from multiple partial responses. For example, in some embodiments, a memory space large enough to store a complete response is allocated. Based on an identifier, such as a sequence identifier, included with each partial response, the corresponding data of each partial response is written the appropriate memory location identified within the allocated memory space. The entire response is complete once all partial responses have been received and their associated data written to the appropriate memory location of the memory space allocated for the complete response.

In some embodiments, network connections 231, 233, 235, and 237 can access memory unit 211 to read from and/or write data to memory banks 221, 223, 225, and 227 with minimal or no network collisions or delays. With four network connections, memory unit 211 and request processing unit 213 can process four memory data access requests, one from each network connection, in parallel. In the event each memory request accesses a different memory bank, the memory requests can each access the required memory banks in parallel. In various embodiments, a decomposition unit is associated with each of network connections 231, 233, 235, and 237 to decompose corresponding memory access requests into partial requests. In some embodiments, a crossbar switch is associated with each of network connections 231, 233, 235, and 237 to route partial requests to and responses to the partial requests from memory banks 221, 223, 225, and 227.

Figure 3:
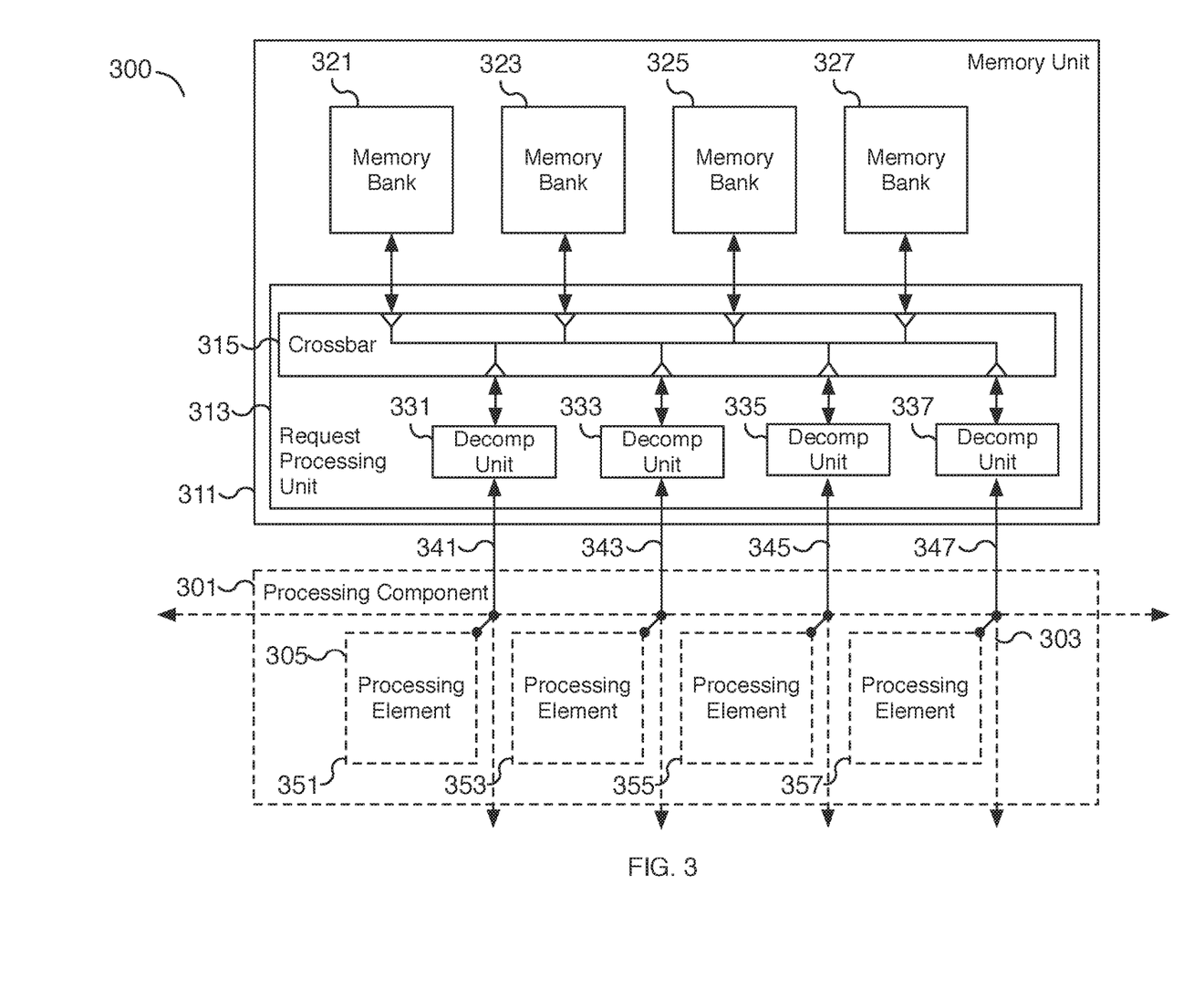
FIG. 3 is a block diagram illustrating an embodiment of a processing element for solving artificial intelligence problems using a neural network.

FIG. 3 is a block diagram illustrating an embodiment of a system for solving artificial intelligence problems using a neural network. In the example shown, the system 300 is a partial depiction of a hardware platform that includes processing component 301 and memory unit 311. Memory unit 311 includes request processing unit 313, crossbar switch 315, memory banks 321, 323, 325, and 327, and decomposition units 331, 333, 335, and 337. Additional memory units may be included but are not displayed. Similar to memory unit 311, each memory unit not shown includes a request processing unit, multiple memory banks, multiple decomposition units, and a crossbar switch. Each memory unit, such as memory unit 311, may be configured with additional (or fewer) memory banks than shown. Processing component 301 is communicatively connected to memory unit 311 via network connections 341, 343, 345, and 347. Each network connection is connected to a decomposition unit of memory unit 311. Network connection 341 is communicatively connected to decomposition unit 331, network connection 343 is communicatively connected to decomposition unit 333, network connection 345 is communicatively connected to decomposition unit 335, and network connection 347 is communicatively connected to decomposition unit 337. Crossbar switch 315 communicatively connects decomposition units 331, 333, 335, and 337 to each of memory banks 321, 323, 325, and 327. In some embodiments, processing component 301 is processing component 101 of FIG. 1 and/or processing component 201 of FIG. 2 and memory unit 311 is memory unit 111, 121, 131, or 141 of FIG. 1 and/or memory unit 211, 221, or 241 of FIG. 2. In various embodiments, the functionality described with respect to processing component 301 and memory unit 311 applies to other memory units connected to processing component 301 including memory units that are not shown in FIG. 3.

In some embodiments, processing component 301 is a processor that includes multiple processing elements such as processing elements 351, 353, 355, and 357. The processing elements of processing component 301 may be arranged as a two-dimensional array and may be connected via a two-dimensional network communication subsystem. Processing elements 351, 353, 355, and 357 are illustrated with dotted lines to reflect that the total number of processing elements is not limited to the four depicted. In the diagram of FIG. 3, only a portion of processing component 301 is shown. Processing component 301 includes network-on-chip subsystem 303 with network connections 341, 343, 345, and 347 communicatively connecting processing elements of processing component 301 to request processing unit 313 of memory unit 311 and decomposition units 331, 333, 335, and 337, respectively. Network-on-chip subsystem 303 is a communication network and/or communication bus that communicatively connects the processing elements, including processing elements 351, 353, 355, and 357, to one another. Network-on-chip subsystem 303 can be used for processing elements to communicate with one another and/or to communicate with memory units such as memory unit 311 via network connections 341, 343, 345, and 347. For example, processing element 351 of processing component 301 can interface with memory unit 311 via network-on-chip subsystem 303 and network connection 341 to read and/or write data from memory. The example of FIG. 3 focuses on the interface between processing component 301 and a single memory unit, memory unit 311, but the techniques disclosed are applicable to other memory units as well.

In some embodiments, network connections 341, 343, 345, and 347 can access memory unit 311 to read from and/or write data to memory banks 321, 323, 325, and 327 with minimal or no network collisions or delays. With four network connections, memory unit 311 and request processing unit 313 can process four memory data access requests, one from each network connection, in parallel. For example, processing element 351 can transmit a memory data access request to memory unit 311 via network connection 341. Similarly, processing element 353 can transmit a memory data access request to memory unit 311 via network connection 343, processing element 355 can transmit a memory data access request to memory unit 311 via network connection 345, and processing element 357 can transmit a memory data access request to memory unit 311 via network connection 347. In various embodiments, processing elements can be configured to transmit memory requests to memory unit 311 using specific network connections. For example, each processing element of a particular group, such as a row group, column group, or another appropriate organizational group of processing elements, can utilize a designated master processing element of the group to transmit its requests to a memory unit. The master processing element transmits requests on behalf of any member of the group to a memory unit via a specific network connection. Different masters can be configured to utilize different network connections, minimizing network collisions and increasing memory bandwidth.

In some embodiments, request processing unit 313 receives memory access requests from processing elements of processing component 301 via a network connection. Each of network connections 341, 343, 345, and 347 is communicatively connected to a decomposition unit, such as decomposition unit 331, 333, 335, and 337, respectively, to decompose received memory data access requests. The memory access requests may be read and/or write requests. Request processing unit 313 decomposes the memory access request received at a network connection using the appropriate decomposition unit and determines whether it can be served, potentially partially, by one of the memory banks of memory unit 311. Although four memory banks are shown in FIG. 3, in various embodiments, memory unit 311 can include fewer or many more memory banks such as 8, 16, 32, 64, or another appropriate number of memory banks. Once decomposed using the corresponding decomposition unit, the received memory data access request is a set of partial requests. For each partial request, request processing unit 313 determines whether to service the partial request or to allow a different memory unit responsible for the requested memory address range to service the partial request. For example, request processing unit 313 determines whether the requested memory address range maps to one of its memory banks, such as one of memory banks 321, 323, 325, and 327. In the event a match is successful, that is, memory unit 311 is responsible for the associated address range of the partial request, the partial request is directed to access the appropriate memory bank(s) via crossbar switch 315. For example, for a partial request mapped to memory bank 321, after the request is decomposed by decomposition unit 335, a read operation corresponding to a request received at network connection 345 can retrieve the requested data from memory bank 321 via crossbar switch 315. The matching memory bank(s) may be determined based on a hashing function. For example, the hashing function may utilize a workload identifier of a processing element requesting access to the address range. In some embodiments, the hashing function inspects a set of bits, such as two or more bits, of a memory address associated with the memory access request. In various embodiments, each network connection and decomposition unit pair can access any memory bank via crossbar switch 315. In some embodiments, each network connection can access a different memory bank in parallel. Crossbar switch 315 allows each of network connections 341, 343, 345, and 347 to route partial requests to and responses to the partial requests from memory banks 321, 323, 325, and 327. Although in FIG. 3, the number of memory banks and network connections match, in various embodiments, the number of memory banks may be more than or fewer than the number of network connections for a memory unit.

Figure 4:
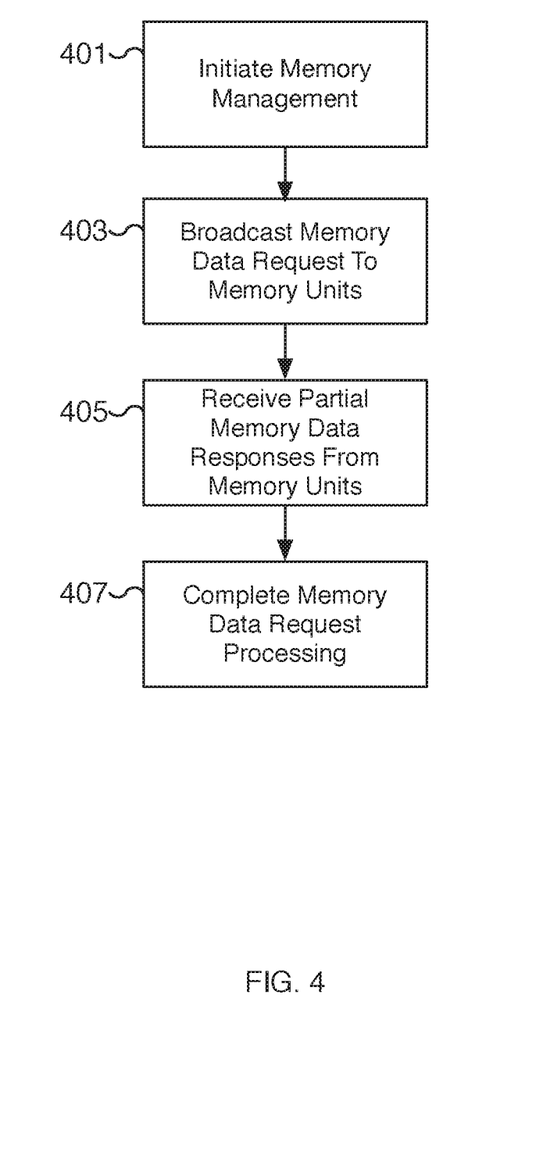
FIG. 4 is a flow chart illustrating an embodiment of a process for performing memory access.

FIG. 4 is a flow chart illustrating an embodiment of a process for performing memory access. For example, an artificial intelligence problem is solved by applying a neural network using data associated with the problem and the neural network. The data is read from and written to memory such as memory units 111, 121, 131, and/or 141 of FIG. 1, memory units 211, 221, and/or 241 of FIG. 2, and/or memory unit 311 of FIG. 3 by a processing element such as processing elements 251, 253, 255, and/or 257 of FIG. 2 and/or processing elements 351, 353, 355, and/or 357 of FIG. 3. In some embodiments, the process of FIG. 4 is performed by one or more processing elements of processing component 101 of FIG. 1, processing component 201 of FIG. 2, and/or processing component 301 of FIG. 3. Using the process of FIG. 4, data elements stored in memory can be distributed across multiple memory units to improve the utilization of memory and the efficiency of memory access operations.

At 401, memory management is initiated. For example, a particular memory access distribution scheme is configured at 401. The configuration may be initiated using a processor instruction such as an instruction directed to a particular processing element. The distribution scheme may be associated with a particular workload such as a particular artificial intelligence problem and neural network. In some embodiments, the initialization includes setting a workload identifier. For example, a workload identifier can be used to configure how data is distributed across multiple memory units. The workload identifier may be a parameter to a processor memory management instruction. Each workload can use a different distribution scheme to improve the utilization and efficiency of memory. Processing elements working on the same dataset or workload can utilize the same workload identifier to share data. By scattering data across memory units using different distribution patterns, such as different distribution patterns for each workload, the data stored in memory is more efficiently distributed across all available memory. In some embodiments, the memory initialization includes configuring the memory access unit size. For example, a memory access unit, such as 128 bytes, 256 bytes, etc., can be configured such that data is written to each memory unit in access unit-sized groups. Larger or smaller access units can be used as appropriate. Data within an access unit group is stored in the same memory unit. In some embodiments, the access unit size is configurable using a programmable instruction to a processor or processing element.

In some embodiments, initialization of the memory management includes configuring or programming a hashing mechanism for distributing data across memory units. For example, a hashing mechanism can utilize a seed to configure the distribution scheme. In some embodiments, the seed is based on specifying a group of bits from a memory address to determine which memory unit is assigned to a particular access unit of data. For example, the hashing mechanism may specify two bits of the memory address, such as two upper bits, and perform a bitwise operation on the specified bits to map an access unit to a memory unit. In some embodiments, the bitwise operation utilizes an XOR operation. In some embodiments, the hashing mechanism can be programmatically configured. For example, a processing element can be configured to utilize a specified hashing function and/or be configured to utilize certain parameters for the hashing function.

At 403, a memory data request is broadcasted to memory units. For example, a request for data from memory is broadcasted to all memory units connected to the processing element of a processing component. In some embodiments, the request is transmitted to a memory unit via a network subsystem such as a network-on-chip subsystem 203 of FIG. 2 and/or network-on-chip subsystem 303 of FIG. 3 and corresponding network connections such as network connections 231, 233, 235, or 237 of FIG. 2 or network connections 341, 343, 345, or 347 of FIG. 3. In some embodiments, four memory units, such as a north, east, south, and west memory unit, surround a processing component such as processing component 101 of FIG. 1. In the example, all four memory units, such as memory units 111, 121, 131, and 141, receive the broadcasted memory data request. In some embodiments, the data request is for a large amount of data and includes data spanning multiple access units. The request can be constructed to reference a base memory address and a size argument to determine how much data is requested starting at the base memory address. Other memory referencing schemes may be appropriate as well. In some embodiments, the broadcasted memory request also includes mapping information corresponding to the distribution scheme. For example, receiving memory units can use the mapping information to determine the hashing mechanism and/or hashing mechanism parameter(s) programmatically configured at 401. As another example, the mapping information may also include the programmatically configured access unit size. In various embodiments, the memory data request may be provided to memory units for reading data or writing data.

At 405, partial memory data responses are received from memory units. For example, two or more partial memory data responses are received from two or more different memory units. The partial responses are responses to the memory data request broadcasted at 403. Since the memory request spans multiple access units, multiple memory units can respond, each providing a partial response corresponding to different access units, to complete the entire request. Each memory unit creates one or more partial responses associated with the one or more access units it is responsible for. For example, data associated with a memory request can be spread across three memory units. Each of the three memory units responds with a partial memory data response. In various embodiments, the network connection used to transmit a request to a particular memory unit at 403 is also used at 405 to receive a potential partial response served by the particular memory unit. At 405, the complete set of partial memory responses are received. In some embodiments, each response includes an identifier such as a sequence identifier for organizing the partial responses into a complete response.

At 407, memory data request processing is completed. For example, the partial responses are ordered into a complete response that includes all of the requested data. In various embodiments, the processing is complete only after all partial responses have been received. For example, sequence identifiers included in partial responses may be used to determine that processing is complete. Data associated with each partial response may be stored in local memory of the processing element. In some embodiments, the completed response may be utilized by more than one processing element. For example, processing elements accessing the same data may share in the utilizing of the completed memory data response.

Figure 5:
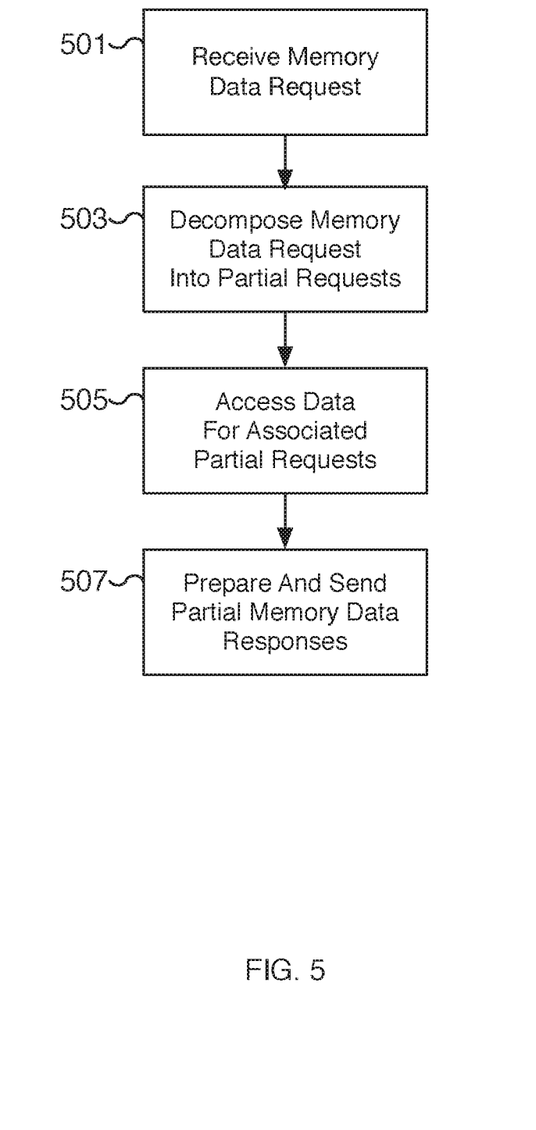
FIG. 5 is a flow chart illustrating an embodiment of a process for responding to memory data requests.

FIG. 5 is a flow chart illustrating an embodiment of a process for responding to memory data requests. For example, a request processing unit of a memory unit utilizes the process of FIG. 5 to respond to a broadcasted memory data request. The request processing unit of each memory unit decomposes the memory request using a decomposition unit connected to the network connection receiving the request. The request processing unit determines which access units the memory unit is responsible for, and then prepares and sends one or more partial responses for the access units managed by the memory unit. In some embodiments, the process of FIG. 5 is performed by request processing units 113, 123, 133, and/or 143 of FIG. 1, request processing unit 213 of FIG. 2, and/or request processing unit 313 of FIG. 3. In some embodiments, the process of FIG. 5 is performed in response to a memory data request broadcasted at 403 of FIG. 4. In some embodiments, the response prepared using the process of FIG. 5 is received by a processing element at 405 of FIG. 4.

At 501, a memory data request is received. For example, a memory data request spanning multiple access units is received. Some of the access units are associated with the memory unit and others may be associated with a different memory unit. In various embodiments, multiple memory units may receive the same memory data request as a broadcasted memory data request. In some embodiments, the memory data request includes a base address and a size parameter to determine the address range requested. The memory data request may also include mapping information to determine the hashing mechanism and/or hashing mechanism parameter(s) used for the particular memory distribution scheme of the memory access request. In some embodiments, memory data request mapping information includes the access unit size.

In some embodiments, each memory unit includes multiple network connections that can each receive a memory data request. The multiple network connections allow multiple processing elements to initiate requests to the memory unit in parallel by accessing the memory unit using different network connections. In some embodiments, the network connections correspond to multiple input/output memory ports of the memory unit. For example, memory unit 211 includes network connections 231, 233, 235, and 237 and memory unit 311 includes network connections 341, 343, 345, and 347. A processing element such as processing element 351 of FIG. 3 can access memory unit 311 via network connection 341 while a different processing element of FIG. 3 can access memory unit 311 via one of network connections 343, 345, or 347.

At 503, the memory data request is decomposed into partial requests. For example, a request spanning multiple access units is split into partial requests. In some embodiments, the decomposing is performed by a decomposition unit of a request processing unit. Each decomposition unit is associated with a corresponding network connection so multiple requests can be decomposed in parallel. In some embodiments, the decomposition unit is decomposition unit 331, 333, 335, or 337 or FIG. 3. In various embodiments, each decomposition unit decomposes the received memory data request into partial requests based on a configured access unit size. For example, a memory data request spanning three access units is decomposed into three partial requests, one for each access unit. As another example, in some embodiments, each memory unit is responsible for multiple access units. For example, in a scenario with a memory data request spanning 32 memory access units that are evenly distributed across four memory units, each memory unit is responsible for eight partial requests. Each partial request corresponds to a memory access unit of data managed by the memory unit.

At 505, data for associated partial requests is accessed. For example, data of access units that match a partial request are retrieved from (or written to) memory banks of the memory unit. In some embodiments, a memory unit may have multiple memory banks and the data of the corresponding partial requests is stored in one or more memory banks of the memory unit. In some embodiments, the data accessed is in response to a partial request decomposed from a larger request spanning multiple access units. In the case of a memory access read operation, the corresponding data is read from memory banks of the memory unit in the event the partial request matches to the memory unit. Similarly, in the case of a memory access write operation, the corresponding data is written to memory banks of the memory unit in the event the partial request matches to the memory unit. In various embodiments, the memory banks are accessed via a crossbar switch connecting each memory bank to the request processing unit processing the partial requests. In some embodiments, the crossbar switch is crossbar switch 315 of request processing unit 313 of FIG. 3.

In some embodiments, a partial request is mapped with a corresponding memory unit based on a programmable distribution scheme. For example, different workloads can distribute data to memory units using different distribution schemes configured using a hashing mechanism. In various embodiments, at 505, the hashing mechanism for the configured distribution scheme is used to determine whether the memory unit receiving the memory data request is responsible for the partial request. In the event the memory unit manages that particular address range of the partial request, the corresponding data is retrieved (or written). Otherwise, the partial request is ignored and will be handled by the correct memory unit responsible for that address range.

At 507, partial memory data responses are prepared and sent. For example, data read from memory units is packaged into responses associated with partial requests. In some embodiments, the response prepared corresponding to a read operation is a partial memory data response since it includes only a portion of the requested data. In various embodiments, each partial response includes an identifier such as a sequence identifier for ordering the partial responses into a complete response. The identifier of each partial memory data response can be utilized by a processing element to order a set of partial responses that are received out of order. The response is transmitted to a processing component for one or more processing elements to receive. In some embodiments, the response is an acknowledgement that a request corresponding to the write operation is complete.

Figure 6:
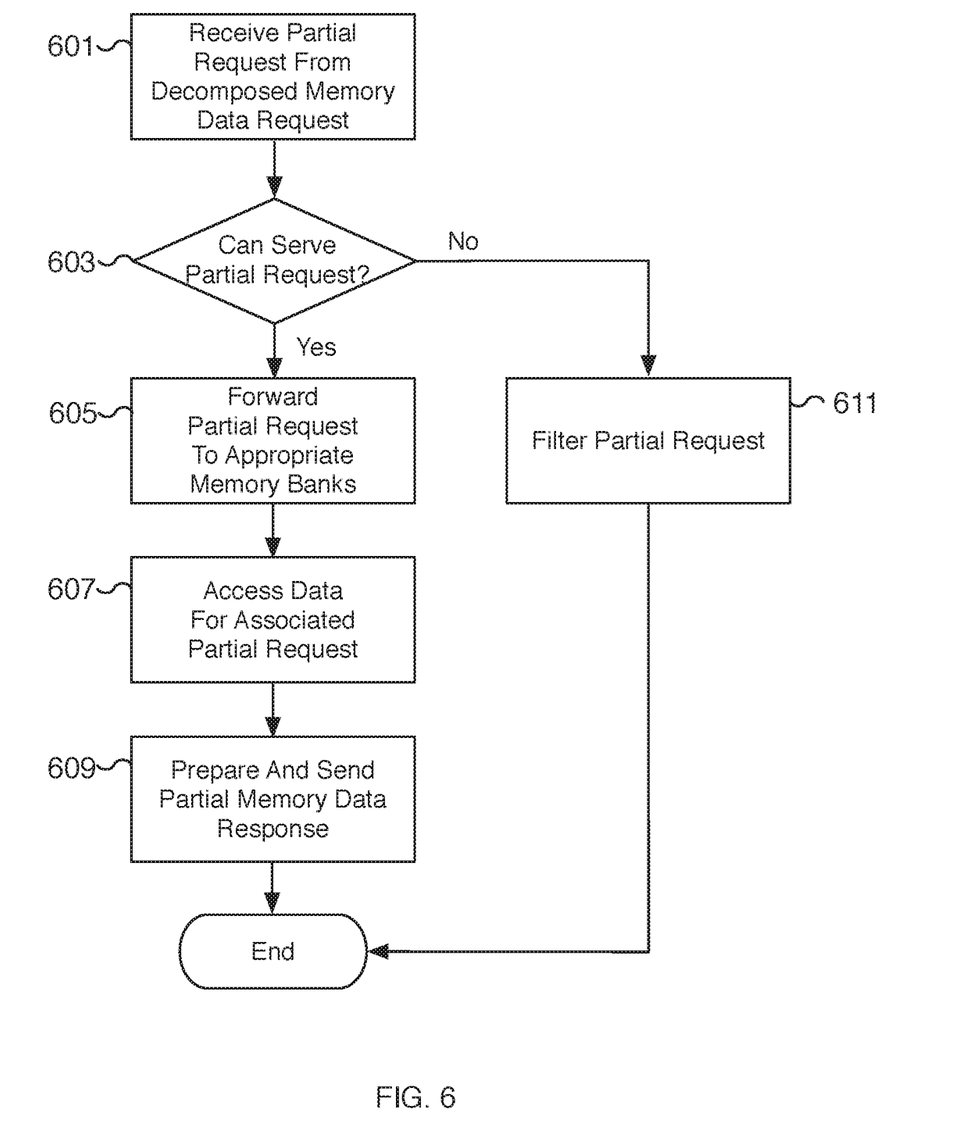
FIG. 6 is a flow chart illustrating an embodiment of a process for responding to partial memory data requests.

FIG. 6 is a flow chart illustrating an embodiment of a process for responding to partial memory data requests. For example, a request processing unit of a memory unit utilizes the process of FIG. 6 to respond to each partial memory data request decomposed from a broadcasted memory data request. Once decomposed into partial requests, the request processing unit of each memory unit determines whether the memory unit is responsible for the access unit referenced by the partial requests. The request processing unit then prepares and sends one or more partial responses for the access units managed by the memory unit. In various embodiments, the memory units are accessed via a crossbar switch such as crossbar switch 315 of FIG. 3. In some embodiments, the process of FIG. 6 is performed by request processing units 113, 123, 133, and/or 143 of FIG. 1, request processing unit 213 of FIG. 2, and/or request processing unit 313 of FIG. 3. In some embodiments, the process of FIG. 6 is performed at 505 and/or 507 of FIG. 5 in response to a memory data request broadcasted at 403 of FIG. 4 and split into partial requests at 503 of FIG. 5. In some embodiments, the response prepared using the process of FIG. 6 is received by a processing element at 405 of FIG. 4.

At 601, a partial data access memory request is received from a decomposed memory data access request. For example, a broadcasted memory request is decomposed into a set of partial requests. At 601, a partial request is received to begin processing the request.

At 603, a determination is made whether the partial request can be served by the memory unit and its associated memory banks. In the event the request can be served, processing continues to 605. In the event the request cannot be served, processing continues to 611. For example, a request cannot served if the request references a memory range that is the responsibility of a different memory unit. In some embodiments, a partial request is mapped with a corresponding memory unit based on a programmable distribution scheme. By applying the programmable distribution scheme, a determination can be made whether the request can be served by the receiving memory unit. For example, in some embodiments, the programmable distribution scheme is configured using a hashing mechanism. The hashing mechanism is used to determine whether the memory unit receiving the memory data request is responsible for the partial request. In the event the memory unit manages that particular address range of the partial request, the corresponding data is retrieved (or written). Otherwise, the partial request is ignored at 611 and will be handled by the correct memory unit responsible for that address range.

At 605, a partial request is forwarded to appropriate memory banks. For example, using a crossbar switch, the partial request is routed to the request appropriate memory banks. In some embodiments, the crossbar switch is crossbar switch 315 of FIG. 3 and allows access to any of the memory banks of the memory unit. The request operation forwarded may be a read or write request addressing memory stored in one or more memory banks. In some embodiments, the appropriate memory banks are determined by applying the programmable distribution scheme.

At 607, data for an associated partial request is accessed. For example, data of access units that match a partial request is retrieved from (or written to) memory banks of the memory unit via a crossbar switch. In some embodiments, a memory unit may have multiple memory banks and the data of the corresponding partial requests is stored in one or more memory banks of the memory unit. In some embodiments, the data accessed is in response to a partial request decomposed from a larger request spanning multiple access units. In the case of a memory access read operation, the corresponding data is read from memory banks of the memory unit in the event the partial request matches to the memory unit. Similarly, in the case of a memory access write operation, the corresponding data is written to memory banks of the memory unit in the event the partial request matches to the memory unit. In various embodiments, the memory banks are accessed via a crossbar switch connecting each memory bank to the request processing unit processing the partial requests. In some embodiments, the crossbar switch is crossbar switch 315 of request processing unit 313 of FIG. 3.

At 609, a partial memory data response is prepared and sent. For example, data read from a memory unit is packaged into a response associated with a partial request. In some embodiments, the response prepared corresponding to a read operation is a partial memory data response since it includes only a portion of the requested data. In various embodiments, each partial response includes an identifier such as a sequence identifier for ordering the partial responses into a complete response. The identifier of each partial memory data response can be utilized by a processing element to order a set of partial responses that are received out of order. The response is transmitted to a processing component for one or more processing elements to receive. In some embodiments, the response is an acknowledgement that a request corresponding to the write operation is complete.

At 611, partial requests are filtered. For example, a request referencing a memory range or access unit that is managed by a different memory unit is discarded. Another memory unit is allowed to respond to the discarded partial request via the broadcasted request received at that other memory unit. Processing for the discarded request is completed and processing ends.

Figure 7:
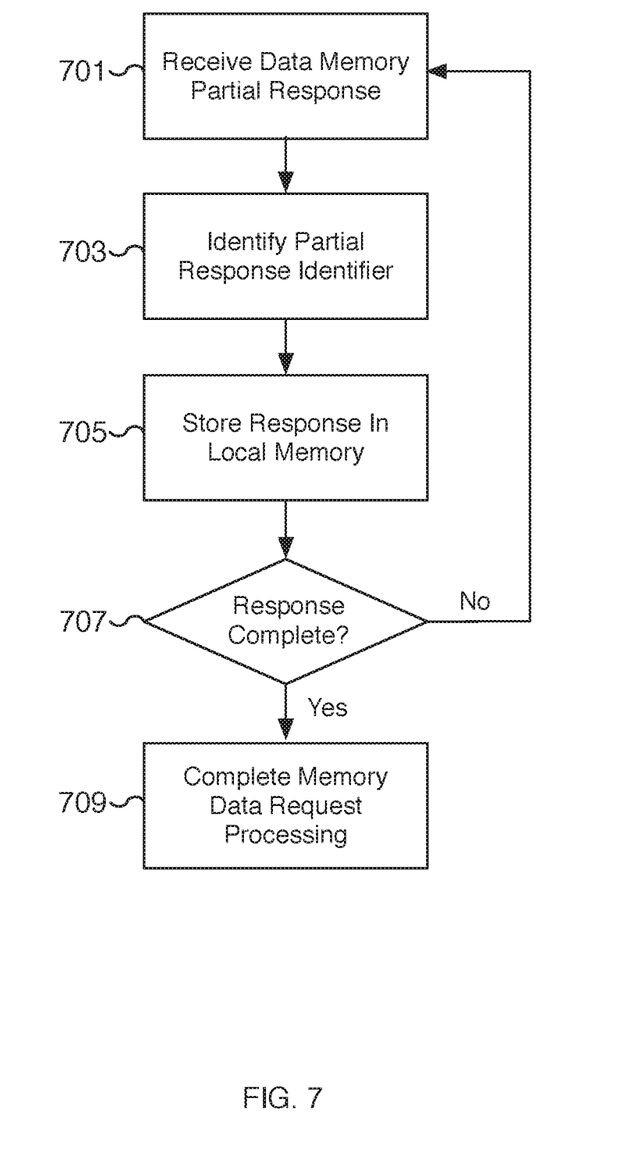
FIG. 7 is a flow chart illustrating an embodiment of a process for performing memory access.

FIG. 7 is a flow chart illustrating an embodiment of a process for performing memory access. For example, a processing element utilizes the process of FIG. 7 to gather data corresponding to a memory data request for a read operation. In some embodiments, a processing element, such as one of processing elements 251, 253, 255, or 257 of FIG. 2 or processing elements 351, 353, 355, or 357 of FIG. 3, receives partial memory data responses from multiple memory units such as memory units 111, 121, 131, and/or 141 of FIG. 1, memory units 211, 221, and/or 241 of FIG. 2, and/or memory unit 311 of FIG. 3. In some embodiments, the process of FIG. 7 is performed in response to a memory data request broadcasted at 403 of FIG. 4 and/or in response to partial memory data responses sent using the process of FIG. 5 and/or using the process of FIG. 6. In some embodiments, the process of FIG. 7 is performed at 405 and/or 407 of FIG. 4 to gather partial responses from a variety of memory units.

At 701, a data memory partial response is received. For example, a partial response to a data memory request sent from a memory unit is received. In various embodiments, the response includes data that is one or more access units in size from the same memory unit. In some embodiments, the response includes identifier information such as a sequence identifier that can be used to order the partial response received relative to other partial responses.

At 703, the data memory partial response is identified. For example, using an identifier included in the received partial response, the data memory partial response is identified relative to the original data memory request. For example, a request may be decomposed or unrolled into five partial requests. The partial response is identified at 703 to determine which of the five partial responses it corresponds to. In some embodiments, the identification is performed by inspecting an identifier such as a sequence identifier. The identification result can be used to determine the ordering of the partial response relative to other partial responses and to reconstruct a complete response from the set of received partial responses.

At 705, a data memory partial response is stored in local memory. For example, data read from memory is extracted from the data payload of a partial response and stored in local memory. In some embodiments, a temporary buffer sized for the requested data is allocated from local memory to construct a complete response from partial responses. Since partial responses may be received out of order relative to their corresponding memory addresses, the data from the partial response is stored in the allocated buffer at a corresponding location based on the relationship of the partial response to the original requested data. For example, a buffer sized for five partial responses is allocated and the data from the received partial response is written to a corresponding address location in the buffer regardless of when the partial response is received. In some embodiments, each partial response is an access unit-sized response or a multiple of an access unit. Using the temporary buffer, a completed data memory response can be reconstructed from partial responses.

At 707, a determination is made whether the response is complete. For example, a response is complete once all partial responses that are required to construct a completed response are received. In the event the response is complete, processing proceeds to 709. In the event the response is not complete, processing loops back to 701 to receive an additional partial response.

At 709, memory data request processing is completed. For example, the data corresponding to a complete response is made available for additional computation such as matrix computation. In some embodiments, the data associated with the completed response is located in local memory such as a local memory store of the processing element. The completed response may be used as input to a matrix compute engine of the processing element. In some embodiments, the completed response corresponds to data describing a neural network or activation data associated with an artificial intelligence problem.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a plurality of memory units, wherein a first memory unit included in the plurality of memory units includes a first request processing unit and a first plurality of memory banks, and wherein the first request processing unit includes a first plurality of memory data request decomposition units and a first crossbar switch of the first memory unit, the first crossbar switch communicatively connecting each of the first plurality of decomposition units included in the first memory unit to each of the first plurality of memory banks included in the first memory unit, wherein at least a portion of the first plurality of decomposition units is configured to decompose a memory data request for memory data spanning a plurality of data access units into a plurality of different partial requests for different subsets of the memory data, and wherein a second memory unit included in the plurality of memory units includes a second crossbar switch; and
  a processor coupled to the plurality of memory units, wherein the processor includes a plurality of processing elements and a communication network communicatively connecting the plurality of processing elements to the plurality of memory units, and wherein at least a first processing element of the plurality of processing elements includes a control logic unit and a matrix compute engine configured to perform a matrix compute operation of an artificial intelligence compute, and the control logic unit is configured to access the plurality of memory units using a first dynamically programmable distribution scheme specifying a first programmatically modifiable distribution pattern of the first processing element for scattering data across the plurality of memory units different from a second dynamically programmable distribution scheme specifying a second programmatically modifiable distribution pattern of a second processing element of the plurality of processing elements for scattering data across the plurality of memory units.

2. The system of claim 1, wherein the first request processing unit of the first memory unit is configured to receive a broadcasted memory request.

3. The system of claim 2, wherein the broadcasted memory request references data stored in each of the plurality of memory units.

4. The system of claim 1, wherein the dynamically programmable distribution scheme utilizes an identifier associated with a workload of the first processing element.

5. The system of claim 1, wherein the first request processing unit is configured to determine whether each of the plurality of partial requests corresponds to corresponding data stored in a corresponding one of the first plurality of memory banks associated with the corresponding request processing unit.

6. The system of claim 1, wherein the first crossbar switch of the first request processing unit is configured to direct a first partial request for data stored in a corresponding one of the first plurality of memory banks to the corresponding memory bank and receive a retrieved data payload from the corresponding memory bank.

7. The system of claim 6, wherein the first request processing unit is configured to prepare a partial response using the retrieved data payload and provide the prepared partial response to the first processing element of the plurality of processing elements.

8. The system of claim 7, wherein the prepared partial response includes a corresponding sequence identifier ordering the partial response among a plurality of partial responses.

9. The system of claim 1, wherein the plurality of memory units includes a north memory unit, an east memory unit, a south memory unit, and a west memory unit.

10. The system of claim 1, wherein the plurality of processing elements are arranged in a two-dimensional array and the communication network communicatively includes a corresponding two-dimensional communication network connecting the plurality of processing elements.

11. The system of claim 10, wherein each decomposition unit of the plurality of decomposition units is configured to only receive a memory request from and only provide a response to processing elements located in a same row or column of the two-dimensional array.

12. The system of claim 4, wherein two or more processing elements of the plurality of processing elements share the identifier.

13. The system of claim 1, wherein a second processing element of the plurality of processing elements is configured with a different dynamically programmable distribution scheme for accessing memory units than the first processing element.

14. The system of claim 1, wherein the control logic unit of the first processing element is further configured with an access unit size for distributing data across the plurality of memory units.

15. The system of claim 1, wherein data elements of a machine learning weight matrix are distributed across the plurality of memory units using the dynamically programmable distribution scheme.

16. A method comprising:
receiving a memory request provided from a first processing element at a first decomposition unit of a first memory unit, wherein the first memory unit includes a first plurality of memory banks and a first crossbar switch, the first crossbar switch communicatively connecting each of a plurality of decomposition units included in the first memory unit to each of the first plurality of memory banks included in the first memory unit, and wherein the first processing element is connected to a second memory unit including a second crossbar switch;
decomposing the memory request for memory data spanning a plurality of data access units into at least a first partial request for a first subset of the memory data and a second partial request for a second subset of the memory data;
determining that a requested first data of the first partial request resides in a first memory bank of the first plurality of memory banks;
determining that a requested second data of the second partial request resides in a second memory bank of the first plurality of memory banks;
directing the first partial request to the first memory bank via the first crossbar switch;
directing the second partial request to the second memory bank via the first crossbar switch;
retrieving the requested first data from the first memory bank via the first crossbar switch;
retrieving the requested second data from the second memory bank via the first crossbar switch;
preparing a partial response that includes the requested first and second data; and
providing the partial response to the first processing element, wherein the first processing element is configured to access a plurality of memory units including the first memory unit and the second memory unit using a first dynamically programmable distribution scheme specifying a first programmatically modifiable distribution pattern of data of the first processing element for scattering data across the plurality of memory units, and wherein a second processing element is configured to access the plurality of memory units using a second dynamically programmable distribution scheme specifying a second programmatically modifiable distribution pattern of data of the second processing element for scattering data across the plurality of memory units.

17. The method of claim 16, wherein the first memory unit includes a plurality of connections communicatively connecting the first memory unit to a processor, the processor includes the first processing element among a plurality of processing elements, and the received memory request is received at a first connection of the plurality of connections.

18. The method of claim 17, wherein the partial response is provided to the first processing element via the first connection.

19. A method comprising:
receiving a first memory request provided from a first processing element at a first memory data request decomposition unit of a first memory unit, wherein the first memory unit includes a first plurality of memory banks and a first crossbar switch, the first crossbar switch communicatively connecting each of a plurality of decomposition units included in the first memory unit to each of the first plurality of memory banks included in the first memory unit, and wherein the first processing element is connected to a second memory unit including a second crossbar switch;
receiving a second memory request provided from a second processing element at a second memory data request decomposition unit of the first memory unit;
decomposing the first memory request for memory data spanning a first plurality of data access units into a first plurality of partial requests for a first subset of the memory data and the second memory request spanning a second plurality of data access units into a second plurality of partial requests for a second subset of the memory data;
determining for each partial request of the first plurality of partial requests and the second plurality of partial requests whether the partial request is to be served from the first plurality of memory banks;
discarding a first group of partial requests from the first plurality of partial requests and the second plurality of partial requests that is not to be served from the first plurality of memory banks;
for each partial request of a second group of partial requests from the first plurality of partial requests that is to be served from the first plurality of memory banks, retrieving data of the partial request via the first crossbar switch, preparing a first partial response using the retrieved data, and providing the first partial response to the first processing element, wherein the first processing element is configured to access a plurality of memory units including the first memory unit and the second memory unit using a first dynamically programmable distribution scheme specifying a first programmatically modifiable distribution pattern of data for scattering data across the plurality of memory units; and
for each partial request of a third group of partial requests from the second plurality of partial requests that is to be served from the first plurality of memory banks, retrieving data of the partial request via the first crossbar switch, preparing a second partial response using the retrieved data, and providing the second partial response to the second processing element, wherein the second processing element is configured to access the plurality of memory units using a second dynamically programmable distribution scheme specifying a second programmatically modifiable distribution pattern of data for scattering data across the plurality of memory units.

20. The method of claim 19, wherein the first memory request was broadcasted to the plurality of memory units.

* * * * *